United States Patent [19]

Gudat

[11] 4,116,494

[45] Sep. 26, 1978

[54] TEST CIRCUIT FOR PERIODICALLY MONITORING THE INTEGRITY OF AN ANTISKID BRAKE CONTROL SYSTEM

[75] Inventor: Wolfgang Gudat, Hanover, Fed. Rep. of Germany

[73] Assignee: WABCO Westinghouse GmbH, Hanover, Fed. Rep. of Germany

[21] Appl. No.: 839,545

[22] Filed: Oct. 5, 1977

[30] Foreign Application Priority Data

Oct. 13, 1976 [DE] Fed. Rep. of Germany ....... 2646061

[51] Int. Cl.² .............................................. B60T 8/02
[52] U.S. Cl. ..................................... 303/92; 340/52 B
[58] Field of Search ..................... 303/92; 324/73 R, ; 340/52 B, 53, 410

[56] References Cited

U.S. PATENT DOCUMENTS

| 3,620,577 | 11/1971 | Neisch et al. | 340/52 B UX |
| 3,818,433 | 6/1974 | Okamoto et al. | 340/410 X |
| 3,866,980 | 2/1975 | Eisele et al. | 303/92 |

*Primary Examiner*—Stephen G. Kunin
*Attorney, Agent, or Firm*—R. W. McIntire, Jr.

[57] ABSTRACT

A test circuit periodically emits a test control signal as long as the vehicle speed exceeds a preselected value and there is no antiskid brake control action. The test signal causes a frequency control circuit to decrease the frequency of a sensor signal that indicates the rotating velocity of a wheel of the vehicle, thereby simulating a wheel deceleration sufficient to obtain wheel behavior signals from the antiskid brake control system. A logic sensing circuit then reacts to these wheel behavior signals to suppress production of an error signal, which otherwise occurs after a predetermined delay period to indicate a defect in the antiskid brake control system.

9 Claims, 3 Drawing Figures

TEST CIRCUIT FOR PERIODICALLY MONITORING THE INTEGRITY OF AN ANTISKID BRAKE CONTROL SYSTEM

BACKGROUND OF THE INVENTION

The invention relates to a device for testing the operation of an antiskid control system.

As is known, the braking of a motor vehicle equipped with an antiskid control system may lead to very dangerous situations in the event of a defect occurring in the electronic installation of the antiskid control system. It is therefore necessary to provide safety circuits which, when defects occur, detect them and, by means of error or switch-off signals, prevent dangerous and inadmissible antiskid control action. Consequently, it is necessary to check, from time to time or preferably, at certain time intervals during various operating conditions of the vehicle, the electronic switching devices which serve the purpose of controlling fluid pressure modulator valves, for operability and operating reliability.

A known checking device of the type mentioned functions by generating a simulated control signal by short-circuiting the speed indicator or sensor, followed by checking as to whether the system responds to a signal so produced. It is a disadvantage that when short-circuiting the sensor it is no longer possible to know at which moment the short-circuiting may be discontinued again, thus creating the danger that undetermined cycle-duration remnants are measured and utilized, and thus, briefly, speed values are found which are too high.

Furthermore, a checking device is known which enables checking as to the proper functioning of the antiskid control system only before starting to drive the vehicle, i.e. when it is standing still.

SUMMARY OF THE INVENTION

The object of the present invention is to improve a device of the type indicated at the beginning in such a manner as to overcome the disadvantages of the known devices and in particular, to check during driving whether the antiskid control system can produce control signals and whether the magnets of the brake pressure modulator valves can be actuated.

The advantages obtained by the device of the present invention resides particularly in the fact that the invention makes use of test signals which are derived from the sensor signals and have a specific frequency which is obtained by dividing the sensor signal frequency, thus making certain that the testing process can be terminated at the right moment, i.e. at the moment of zero passage of the sensor signals; this ensures that, after terminating the checking, the subsequent measurement starts with a full measuring interval, thus preventing a condition in which for a short time speed values are simulated which are too high.

The testing can be carried out at any time while driving, provided that at that precise moment, there is no antiskid control action taking place.

BRIEF DESCRIPTION OF THE DRAWINGS

In the drawings to which the following more detailed description refers.

DESCRIPTION AND OPERATION

Figure 1:
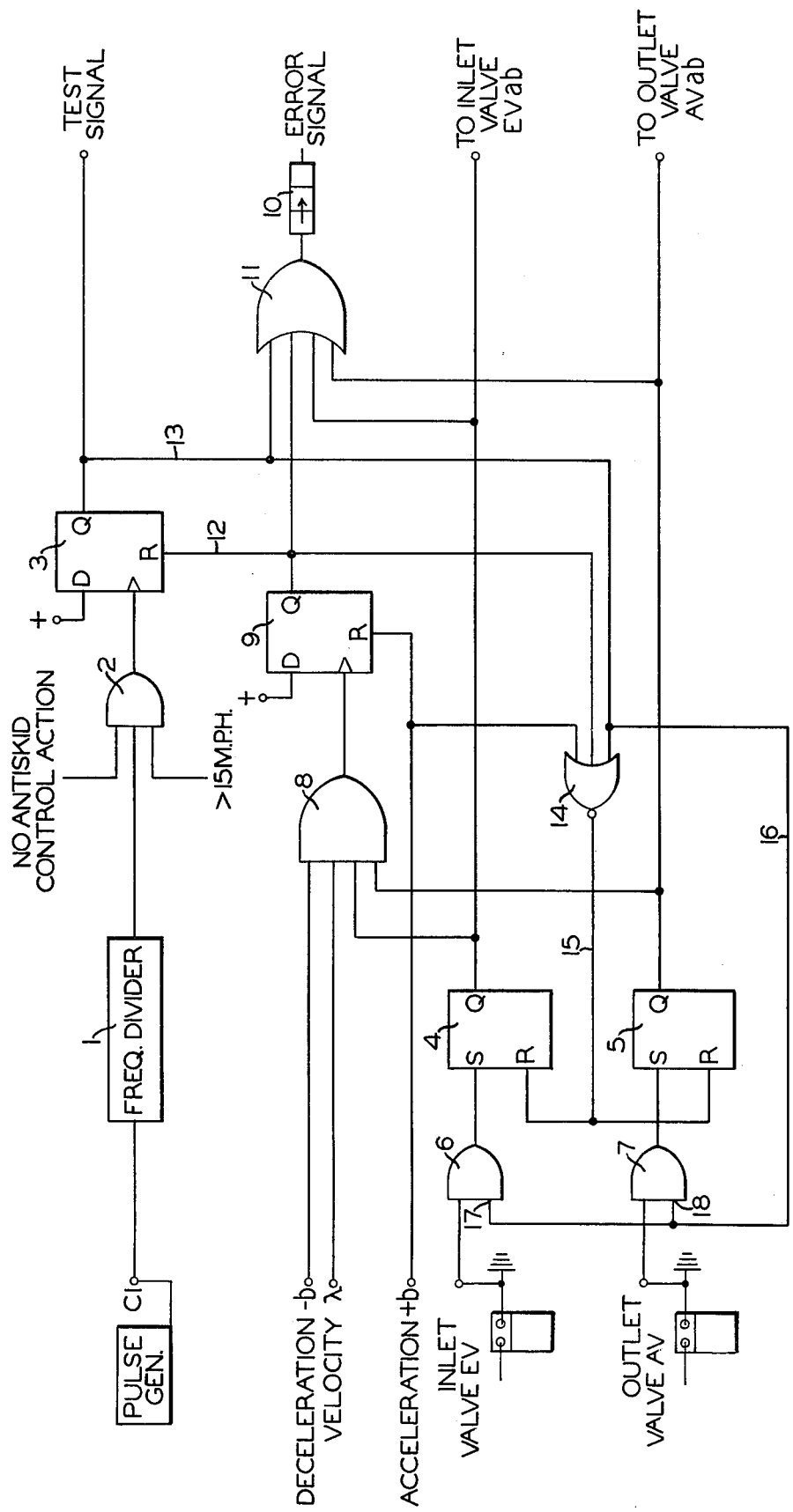
FIG. 1 shows a circuit diagram for producing the test control signal, including a logic sensing portion.

Referring now to FIG. 1, there is shown a diagram of a circuit for producing a test control signal and a circuit for a logic sensing device as used for testing the operation of the antiskid control system. The circuit for producing the test control signal essentially consists of a pulse generator (not shown), a frequency divider 1, an AND gate 2 and a flip-flop circuit 3 which are interconnected, as shown. On the input side, terminal C1 receives pulses from the pulse generator and on the output side there is produced the test control signal, which is transmitted to the circuit for dividing the sensor signal frequency, shown in FIG. 2 or 3.

The logic sensing circuit is essentially comprised of storages 4, 5 and AND gates 6, 7 associated with the inlet valve and outlet valve of a fluid pressure modulator valve, and further, an AND gate 8 for establishing the logical connection of the deceleration threshold, velocity threshold and modulator valve and control signals, as well as a further storage 9 which is set by the output signal of the AND gate 8, and a timing element 10, which is connected with the output of a OR gate 11, to the inputs of which the outputs of the storages 3, 4, 5 and 9 are connected.

The circuit for producing the test control signal and the logic sensing circuit are, as shown, interconnected by means of the wires 12 and 13.

The circuit of FIG. 1 functions as follows:

Terminal C1 receives pulses coming from the pulse generator. The frequency of the pulses is divided in the frequency divider 1 which sends an initiating pulse to the AND gate 2, for instance, every 5 minutes. This initiating pulse is transmitted from the AND gate 2 to the storage 3, that is, to the pulse input of this storage, only when there is no antiskid control action taking place and when there is a certain minimum speed, e.g. 15 mph. When these conditions are met, by means of appropriate information signals to further inputs of the AND gate 2, then flip-flop 3 is set, so that there occurs a test control signal on its Q output and thus on the terminal marked "Test". The test control signal actuates the 2:1 divider of FIG. 2 or 3 and, since it is transmitted to the storages 4 and 5 via the wire 13, a NOR gate 14 and a wire 15, terminates the resetting of said storages. In addition, this test control signal arrives, via the wire 13 and a wire 16, at the inputs 17 and 18 of the AND gates 6 and 7, as a result of which they are enabled.

Dividing the sensor signal frequency causes a deceleration threshold to be simulated and a deceleration signal ($-b$ signal) to be produced which actuates the modulator inlet valve (not shown) to cut off the brake pressure supply. Via a terminal EV and the gate 6, the storage 4 is set and its output signal accordingly inhibits, via a terminal EVab, the further actuation of the modulator inlet valve. There then occurs a velocity threshold signal ($\lambda$ signal) and the modulator outlet valve (not shown) is actuated to vent brake pressure. This causes the flip-flop 5 to be set via a terminal AV and the gate 7. The output signal of flip-flop 5 likewise inhibits the actuation of the modulator outlet valve via terminal AVab. At this moment, at the gate 8, the AND condition has been met, and flip-flop 9 is set, whereby its output signal resets the flip-flop 3, as a result of which the test control signal drops out and the 2:1 frequency divider is switched off. Due to this switching off, the simulated sensor signal frequency rises from the reduced value to the correct value and in doing so, simulates a wheel acceleration, so that there appears an acceleration signal on terminal +b which resets the flip-flop 9. The +b acceleration signal drops out as soon as the updated frequency becomes constant, so that the flip-flops 4 and 5 are reset via the NOR gate 14, thus creating the possibility of enabling the brake pressure modulator valve to be controlled again by — so to speak — "correct" control signals. Since now all the flip-flops 3, 4, 5 and 9 have been reset, there occurs a low level signal on the output of the OR gate 11, which switches off the timing element.

During the whole testing time, the timing element 10 is being controlled via the OR gate 11. In the event of a defect, one or several of the flip-flop circuits 3, 4, 5 and 9 are not reset. For instance, if the +b acceleration signal fails to occur, flip-flop 9 is not reset. As a result, the timing element 10 is controlled, via the gate 11, for a longer time period than is necessary for a test run to be carried out, and hence an error signal is produced which is transmitted to a safety circuit.

The ciruits, shown in FIGS. 2 and 3, for dividing the sensor signal frequency will be explained hereinafter.

Figure 2:
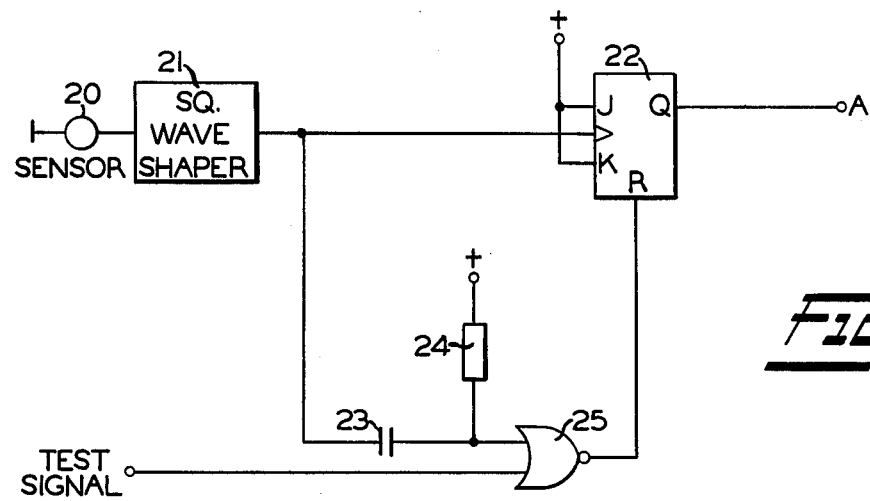
FIG. 2 shows a first embodiment of a circuit for dividing the sensor signal frequency by 2.

In the circuit according to FIG. 2, sensor signals are transmitted from a sensor 20, via a sine-square wave shaping circuit 21, to the pulse input of a JK type flip-flop 22 and, via a differentiator 23/24, to an input of a NOR gate 25, the other input of which receives the test control signal via a terminal marked "Test". When operating normally, there is a low level signal on the "Test" terminal. This low signal makes it possible that, with each trailing edge of the input signal or sensor signal, the JK flip-flop 22 is reset via the NOR gate 25 and, with the immediately following leading edge, can be set again. This causes the JK flip-flop, which normally operates as a 2:1 divider, to function on a 1:1 basis. If now a high signal occurs at the "Test" terminal, the resetting is inhibited and the JK flip-flop functions in the normal fashion as a 2:1 divider. This produces, on the output terminal A, a signal with half the input frequency or half the sensor signal frequency and thereby simulates a wheel behavior condition capable of bringing about a deceleration threshold signal −b and a velocity threshold signal λ, as shown in FIG. 1.

Figure 3:
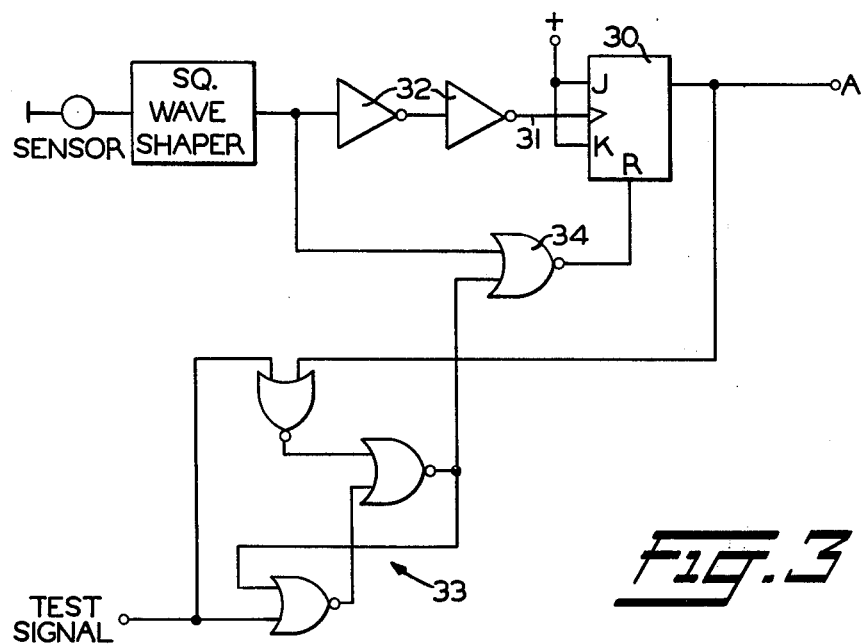
FIG. 3 shows an alternate embodiment of a circuit for dividing the sensor signal frequency by 2.

In the circuit as shown in FIG. 3, the resetting of a JK flip-flop 30 does not take place with the trailing edge of the input signal, but during the "low" time of the input signal or sensor signal. This requires additional measures. In the pulse-supply line 31 of the JK flip-flop 30, there is therefore provided a delay device 32 to assure that the resetting is terminated before the switching edge reaches the pulse input.

In order to provide positive switching conditions, the switching from the 2:1 ratio back to the 1:1 operation is allowed to take place only when the test control signal on the input "Test" terminal and the output signal of the JK flip-flop on the output terminal A are both at a low signal level. To this end, by means of the test control signal, a flip-flop 33 is set which subsequently is reset only when low signals are present on the terminals "Test" and A. the switch from 2:1 to 1:1 is then effected, via a NOR gate 34, by means of the output signal of the storage 33 in a manner similar to that of the circuit in FIG. 1.

Having now described the invention, what I claim as new and desire to secure by Letters Patent, is:

1. A test circuit for an antiskid brake control system of a vehicle, said antiskid system including a wheel speed sensor and modulator valve means via which the vehicle brake pressure is regulated in accordance with wheel behavior signals developed from the output frequency of said wheel speed sensor, said test circuit comprising:
    (a) pulse generator means;
    (b) circuit means subject to the output of said pulse generator means for initiating a periodic test signal, comprising:
        (i) an AND gate having a first input connected to the output of said pulse generator means, a second input subject to a signal representative of the vehicle speed exceeding a certain chosen value, and a third input subject to a signal indicative of the antiskid brake control system being inactive; and
        (ii) a first flip-flop circuit having a set input connected to the output of said AND gate, a stable output providing said periodic test signal when a signal is present at the output of said AND gate, and a reset signal;
    (c) a frequency divider circuit operative responsive to said test signal for reducing the output frequency of said wheel speed sensor to simulate a wheel behavior condition in response to which said wheel behavior control signals are provided to pilot operation of said modulator valve means; and
    (d) a logic circuit for sensing said wheel behavior control signals and modulator valve pilot signals produced in accordance with said wheel behavior control signals so as to provide an error signal in the absence of any one of said control and pilot signals.

2. A test circuit as recited in claim 1, wherein said logic circuit includes timer means for providing a time interval during which said error signal is withheld, said time interval being chosen to at least equal the time required for said logic circuit to complete a preselected sequence of events resulting from said sensing of said wheel behavior control signals and said modulator valve pilot signals.

3. A test circuit as recited in claim 1, wherein said logic circuit includes means for providing a first output of said logic circuit connected to said reset input of said first flip-flop circuit to terminate said test signal when said wheel behavior signals corresponding to a deceleration and velocity threshold are present concurrent with said modulator valve pilot signals.

4. A test circuit as recited in claim 3, wherein said logic circuit further includes monitoring means for providing inhibit signals to terminate further operation of said modulator valve means in response to operation thereof when said test signal is present.

5. A test circuit as recited in claim 4, wherein said logic circuit further comprises:
    (a) an OR gate having inputs subject to said test signal, said inhibit signals and said first output of said logic circuit; and
    (b) timer means connected to the output of said OR gate for providing said error signal after a predetermined time period.

6. A test circuit as recited in claim 5, further characterized in that termination of said test signal simulates such wheel velocity as to provide a wheel behavior signal corresponding to an acceleration threshold.

7. A test circuit as recited in claim 6, further characterized in that said acceleration signal terminates said first output of said logic circuit, said logic circuit further comprising a NOR gate having a first input subject to said acceleration signal, a second input subject to said first output of said logic circuit, a third input subject to said test signal and an output in response to which said inhibit signals are terminated.

8. A test circuit as recited in claim 7, further characterized in that said time period is chosen to be at least equal in duration to the time required to develop and subsequently terminate said test signal, said first output of said logic circuit and said inhibit signals.

9. A test circuit as recited in claim 1, wherein said frequency divider circuit comprises:
(a) said wheel speed sensor;
(b) a square wave shaping circuit to which the output of said wheel speed sensor is connected;
(c) a second flip-flop circuit having a set input, reset input and an output, said set input being subject to the output of said square wave shaping circuit; and
(d) logic means connected to the reset input of said second flip-flop circuit and subject to the output of said square wave shaping circuit and said test signal for resetting said flip-flop circuit with each pulse of said square wave shaping circuit to produce a 1:1 input/output ratio of said flip-flop circuit in the absence of said test signal, and for preventing the resetting of said flip-flop circuit to produce a 2:1 input/output ratio thereof in the presence of said test signal, said output of said flip-flop circuit providing said reduced output frequency of said wheel speed sensor.

* * * * *